Nov. 21, 1950 — F. MAISEL — 2,530,886
STEERING MEANS FOR MANUALLY PROPELLED DEVICES
Filed Nov. 9, 1946 — 2 Sheets-Sheet 1
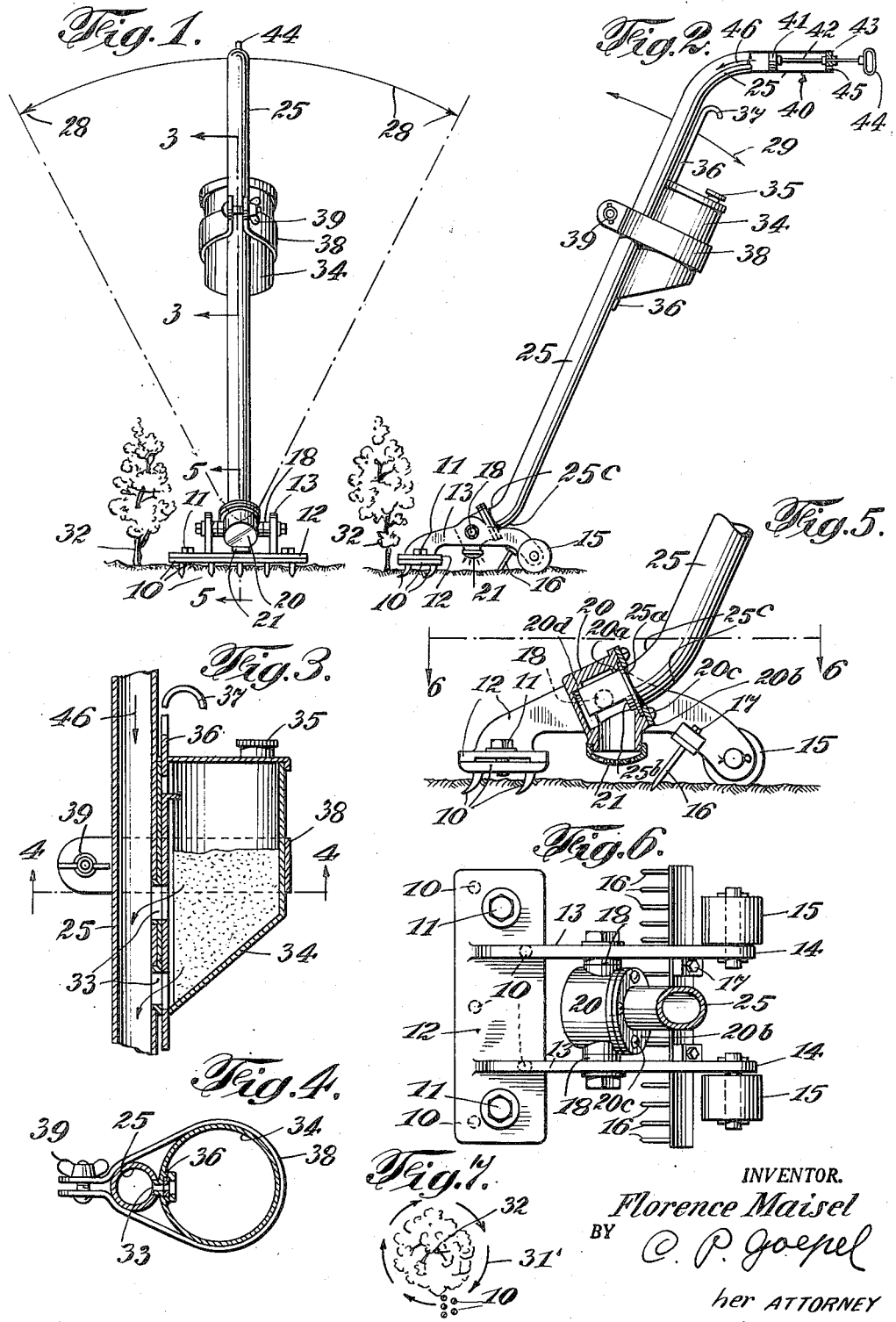
INVENTOR.
Florence Maisel
BY C. P. Goepel
her ATTORNEY

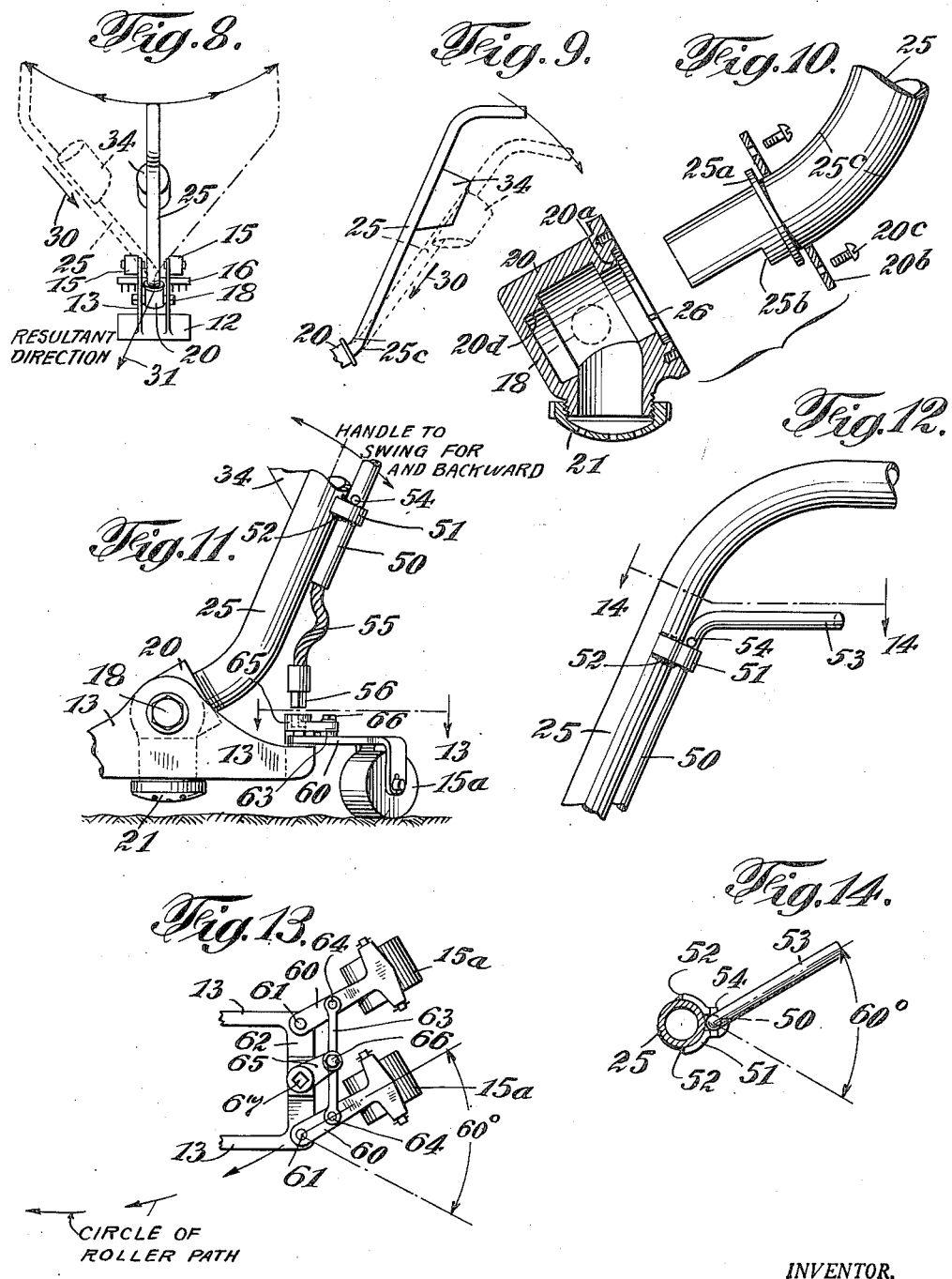

UNITED STATES PATENT OFFICE 2,530,886

STEERING MEANS FOR MANUALLY PROPELLED DEVICES

Florence Maisel, Colts Neck, N. J.

Application November 9, 1946, Serial No. 708,965

3 Claims. (Cl. 280—48)

This invention relates to garden implements.

The object of the invention is to provide an implement which will open the surface of the ground, and implant a fertilizer or plant auxiliator into the open groove so formed, the important improvement being to form this groove or furrow in a circle around the plant.

Heretofore, in the culture of plants, such as rose bushes, hand tools were used to open or loosen the coil, by hand, around the stalk, before the fertilizer was applied. Fertilizer was then applied by hand, necessitating carrying a container holding the fertilizer, which was a slow, arduous task, and also wasteful.

The improvement consists in a frame member having means to open the ground, means to inject a fertilizer or plant auxiliator into the opened ground, and means to cause the plow member and said means to travel in a circle around the plant stalk, whereby the improved implement is simply placed in a position at a suitable point radially of the axis of the stalk, and subjected to a pushing action, when the implement traverses a circle around the stalk, whereupon, the implement is moved to a suitable position adjacent to another stalk.

More particularly, the improved implement comprises a cup supported on a frame member having rollers, said cup having a distributor, and pivotally supported to the frame member, with said cup having a tubular member to receive from reservoir or container by means of a pump, a supply of powder, said tubular member having a neck portion so arranged as to translate a force applied in one direction, into another direction, by turning of the tubular member in the cup, whereby the implement moves in a circular direction.

As a further embodiment, positive means may be applied to steer the rollers, that is, cause the rollers to act like a rudder, and thereby cause the implement to move in a circle around the plant stalk.

Various improvements like limiting the movement of the tubular member, controlling the supply of the powder, applying a raking device, augment the invention described.

The invention will be more fully described hereinafter, embodiments thereof shown in the drawings, and the invention will be finally pointed out in the claims.

In the accompanying drawings,

Fig. 1 is a front elevation of the improved implement;

Fig. 2 is a side elevation;

Fig. 3 is a vertical section taken on line 3—3 of Fig. 1;

Fig. 4 is a horizontal section taken on line 4—4 of Fig. 3;

Fig. 5 is a vertical section taken on line 5—5 of Fig. 1;

Fig. 6 is a plan view taken from the horizontal section line 6—6 of Fig. 5;

Fig. 7 is a diagrammatic drawing of a plant, showing the circular passage of the improved implement;

Fig. 8 is a diagrammatic top view, showing the disposition of the tubular member;

Fig. 9 is a diagrammatic side view;

Fig. 10 is a detail exposed view of the cup, distributor, and end of the tubular member;

Fig. 11 is a partial side view of the lower part of an alternative form;

Fig. 12 is a partial side view of the upper part of the same;

Fig. 13 is a partial plan view of the same, and

Fig. 14 is a section on the line 14—14 of Fig. 12 showing the range of movement of the operative handle.

Similar characters of reference indicate corresponding parts throughout the various views.

Referring to the drawings, the ground loosener 10 is applied detachably by bolts 11 to a frame member 12, which has parallel ribs 13 extending to roller supports 14 for rollers 15. Preferably rake members 16 may be applied to the underside of the rib 13, by suitable fastening means 17.

Between the ribs 13, and pivoted thereto is a trunnion 18, pivotally supporting an enlarged cup 20, detachably screwed on the cup 20, which communicates with the hollow interior of an upright tubular member 25. The lower end of the tubular member 25 has a flange 25a, which seats on a shoulder 20a, and is held in position by a removable plate 20b, held by screws 20c. The extreme end of the tubular member 25 seats in a bore 20d of the cup 20. The tubular member has a cut out portion 25b, to enable the contents of the tubular member 25 to drop to the distributor 21, during any position of the member 25 when moved from one position to another, upon the rotation of the end in the cup. To permit the member 25 to rotate in either direction, but limit such rotation, the flange 25a may be provided with an arcuate cut out, engaged by a pin 26. The extent of movement of the member 25 in either direction as a result of such rotation is shown in Fig. 1 by the double arrowed arc 28. The movement of the member 25 on its trunnion is shown by the double arrowed arc 29. When the member 25 is moved to one side, as shown in Fig. 8, and a push applied to the member 25, as shown by the arrow 30, the resultant direction of the movement of the frame member 12, is as shown by the arrow 31 in Fig. 8. When the loosener 10 and the rollers 15 are on the ground, the tubular member 25 may be moved to either side, and when pushed, the frame member 12 will move in a circle 31' around a bush or plant 32, as shown in Fig. 7. This circular movement is due to the fact that the lower end of the tubular member 25 is bent as shown by 25c. Thus, when the member 25 is rotated and its free end moved over to one side, any push applied to the free end, causes the cup 20 to move in a circle.

As an alternative embodiment as shown in Fig. 11, a connection may be applied to the member 25, to move the pair of rollers 15a to a position to insure the direction of the frame member 12. When such a connection is preferred, the powder container 34 is placed at the front instead of the rear of the member 34, the pump, etc. being substantially the same. A rod 50 is supported by brackets 51, two or more, suitably welded as at 52, to the support 25. Instead of welding, rivets, bolts, or other suitable fastening means may be employed. The upper end of the rod 50 has a bent portion or handle 53, with a pin 54 resting on the upper bracket 51, to limit the downward movement of the rod 50. The lower end of the rod 50 has one end of a flexible wire 55 connected therewith, the other end of which has a square shaped end member 56 secured thereto. The wire or cable is sufficiently rigid against torsional strains, in order to translate any turning movement of the rod 50 to the square shaped end 56. Instead of supporting the rollers 15a directly to the ribs 13, as shown in Fig. 6, the rollers 15a, are now supported by movable links 60, which are pivoted at 61 to the yoke 62 formed on the ribs 13. A strap 63 has its ends pivoted at 64 to the links 60. To the central portion of the strap 63, a control member 65 is pivoted at 66. This control member 65 is pivoted to the yoke 62, and has a square shaped recess 67. When the square shaped end 56 of the cable 55 is inserted into the recess 67 of the control member, and the rod 50 is rotated on its axis, then the control member moves the strap 63 and this moves the two links 60; and hence the wheels 15a, to a position, whereby the frame member partakes of a circular course. A second rake like that shown by 16 in Fig. 5, may be applied to the structure of Fig. 11.

In Fig. 3, the tubular member 25, has openings 33 to communicate with the interior of a casing 34 supported on the member 25. The casing contains a fertilizer or plant auxiliator, and has a filling cap 35. A slide 36 with a handle 37 enables the openings 33 to be opened or closed, or partially closed. The casing is held in position by a strap 38 and a fastener 39.

In Fig. 2, at the upper end of the tubular member 25, a pump 40 is disposed consisting of a piston 41 slidable within the interior of the tubular member, and having its piston rod 42 pass through a disc 43, fixed to the member 25, said rod 42 having an operating handle 44. A vent 45 is provided in the disc. By operating the piston, the air pressure as shown by the arrow 46, induces the flow of a supply of the powder in the casing 34, and ejects it out of the distributor 21.

In the preferred embodiment of my improved device, a tubular member of 36 inches to 40 inches high, has given satisfaction with a base of about 6 inches to 8 inches in width, and with the size of the distributor 21 varying generally with the selected sizes.

While I have shown a form of soil loosener 10 and a second rake 16, it is clear that any suitable and known instrument may be used in place thereof.

The device may be used as a weed eradicator, by using a weed destroyer powder or solution in the container.

I have described several forms of my invention, but obviously various changes may be made in the details disclosed without departing from the spirit of the invention as set out in the following claims.

I claim:

1. In a steering means for manually propelled devices, the combination of a frame member having supporting rolling members below the same, a journal member pivoted to said base member, the axis of the journal member being planularly coincident with the longitudinal axis of the frame member, a tube journaled in said journal member, having a shorter straight part entering into and co-axial with said journal member and rotatable therein, and having a longer straight part to act as a handle, with an angularly bent part adjacent the journal member and interposed between said shorter and longer parts, said angular part being in a plane coincident with a vertical plane passing through the axis of the journal member and frame member, when the longer part is in said plane, and said angular part being at an angle to said vertical plane when the longer part is spaced from said vertical plane, by rotation of the tube in the journal member, whereby pressure applied to the longer part when the longer part is in a vertical plane passing through the shorter part, moves the frame member in line with the direction of said pressure and in line with said vertical plane, and when the longer part is in a plane at an angle to the vertical plane passing through the shorter part, said applied pressure moves the frame member at an angle to the direction of the pressure and at an angle to said vertical plane to enable the frame member to move in an orbit of which the axis of an obstruction is the center.

2. The structure as defined in claim 1, in which the straight portion has surface contact with the interior of the journal independent of a cut out part in the straight portion which extends within the journal member.

3. In a steering means for manually propelled devices, the combination of a frame member having supporting rolling members below the same, a journal member on said base member, the axis of the journal member being planularly coincident with the longitudinal axis of the frame member, a member journaled in said journal member having a straight part adjacent said journal member, co-axial with said journal member and rotatable therein, and having a longer straight part to act as a handle, and having an angular part between the straight parts, said angular part being in a plane coincident with a vertical plane passing through the axis of the journal member and frame member, and said angular part being at an angle to said vertical plane by rotation of the member, whereby pressure applied to the frame member in said vertical plane, moves the frame member in line with the direction of said pressure and in line with said vertical plane, and when the angular part is in a plane at an angle to the vertical plane, said applied pressure moves the frame member at an angle to the direction of the pressure and at an angle to said vertical plane to enable the frame member to move in an orbit of which the axis of an obstruction is the center.

FLORENCE MAISEL.

REFERENCES CITED

The following references are of record in the file of this patent:

UNITED STATES PATENTS

| Number | Name | Date |
| --- | --- | --- |
| 1,080,038 | Youngberg | Dec. 2, 1913 |
| 1,292,391 | Dougherty | Jan. 21, 1919 |
| 1,689,866 | Erickson | Oct. 30, 1928 |
| 2,026,460 | Cobb | Dec. 31, 1935 |
| 2,162,313 | McCabe et al. | June 13, 1939 |
| 2,213,792 | Dow et al. | Sept. 3, 1940 |
| 2,235,043 | Ronning | Mar. 18, 1941 |

FOREIGN PATENTS

| Number | Country | Date |
| --- | --- | --- |
| 151,916 | Great Britain | Oct. 7, 1920 |